United States Patent
Kleve et al.

(10) Patent No.: US 11,613,277 B2
(45) Date of Patent: Mar. 28, 2023

(54) NETWORK OF HOME SMART LISTENING DEVICES LINKED TO AUTONOMOUS VEHICLE

(71) Applicant: FORD GLOBAL TECHNOLOGIES, LLC, Dearborn, MI (US)

(72) Inventors: Robert B. Kleve, Ann Arbor, MI (US); Eric L. Reed, Livonia, MI (US); John R. Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 12 days.

(21) Appl. No.: 17/532,084

(22) Filed: Nov. 22, 2021

(65) Prior Publication Data

US 2022/0073110 A1 Mar. 10, 2022

Related U.S. Application Data

(63) Continuation-in-part of application No. 17/086,601, filed on Nov. 2, 2020, now Pat. No. 11,210,929, and
(Continued)

(51) Int. Cl.
  *G10L 15/30* (2013.01)
  *G10L 25/51* (2013.01)
  (Continued)

(52) U.S. Cl.
  CPC ....... *B60W 60/00253* (2020.02); *G10L 15/22* (2013.01); *G10L 15/30* (2013.01);
  (Continued)

(58) Field of Classification Search
  None
  See application file for complete search history.

(56) References Cited

U.S. PATENT DOCUMENTS

| 7,477,144 B2 | 1/2009 | Albert |
| 8,594,616 B2 | 11/2013 | Gusikhin et al. |

(Continued)

FOREIGN PATENT DOCUMENTS

| JP | 2002236985 A | 8/2002 |
| WO | 2005106815 A1 | 11/2005 |
| WO | 2013178869 A1 | 12/2013 |

OTHER PUBLICATIONS

Alexa is Now Even Smarter—New Features Help Make Everyday Life More Convenient, Safe, and Entertaining, Press Release, Seattle—Business Wire, Sep. 20, 2018, pp. 1-5.
(Continued)

*Primary Examiner* — John F Mortell
(74) *Attorney, Agent, or Firm* — Frank L. Lollo; MacMillan, Sobanski & Todd, LLC

(57) ABSTRACT

Neighborhood monitoring is performed by configuring a cluster server within a public network to maintain a cluster directory identifying cluster members including a neighborhood of smart listening devices and user vehicles. The neighborhood includes a cluster of dwellings, and the user vehicles includes an autonomous vehicle. The surroundings of the smart listening devices and the user vehicles are monitored using sensors in the smart listening devices and the user vehicles. When an alerting event is detected with one of the sensors, a corresponding one of the smart listening devices and the user vehicles that detected the alerting event initiates a message to another cluster member based on the cluster directory. A responsive action is executed in response to the detected alerting event which includes commanding the at least one autonomous vehicle to autonomously relocate to a designated location.

20 Claims, 13 Drawing Sheets

Related U.S. Application Data a continuation-in-part of application No. 16/240,967, filed on Jan. 7, 2019, now Pat. No. 10,825,332.

(51) Int. Cl.
  *H04W 4/44*  (2018.01)
  *B60W 60/00*  (2020.01)
  *G10L 15/22*  (2006.01)
  *H04W 76/10*  (2018.01)

(52) U.S. Cl.
  CPC ............. *G10L 25/51* (2013.01); *H04W 76/10* (2018.02); *B60W 2556/45* (2020.02)

(56) References Cited

U.S. PATENT DOCUMENTS

| | | |
|---|---|---|
| 9,142,118 B2 | 9/2015 | Patenaude et al. |
| 10,079,021 B1 | 9/2018 | Barra Chicote et al. |
| 2013/0088352 A1 | 4/2013 | Amis |
| 2013/0141228 A1* | 6/2013 | Nagda ................... G08G 1/205 340/439 |
| 2018/0048850 A1* | 2/2018 | Bostick .................. H04N 7/188 |
| 2018/0234843 A1 | 8/2018 | Smyth et al. |
| 2019/0304213 A1* | 10/2019 | Chen .................... G07C 5/0808 |

OTHER PUBLICATIONS

Home Security Made Easy, Transparent and Affordable, Point Security System & Smart Alarm, pp. 1-6, Aug. 31, 2018.
Leeo Smart Alert | Peace of Mind with Simple Alarm Monitoring, Leeo, Inc. 2018, https://www.leeo.com/product.

* cited by examiner

NETWORK OF HOME SMART LISTENING DEVICES LINKED TO AUTONOMOUS VEHICLE

CROSS REFERENCE TO RELATED APPLICATIONS

This application is a continuation-in-part of co-pending U.S. application Ser. No. 17/086,601, filed Nov. 2, 2020, entitled "Home Smart Listening Devices Linking To Multiple Transport Vehicles," which is a continuation-in-part of U.S. application Ser. No. 16/240,967, filed Jan. 7, 2019, entitled "Home Smart Listening Device Linking To Transport Vehicle," both of which are incorporated herein by reference.

STATEMENT REGARDING FEDERALLY SPONSORED RESEARCH

Not Applicable.

BACKGROUND OF THE INVENTION

The present invention relates in general to home and vehicle security and safety, and, more specifically, to one or more home automation/smart assistants interfacing with one or more transport vehicles when monitored events occur.

As the Internet of Things (IoT) continues to expand, more and more devices are connected to the internet including smart smoke alarms, house security alarms, carbon monoxide (CO) detectors, doorbells, sump pump/flood alarms, and others. This usually requires older alarm units in the home to be exchanged for a smart version of the device that has some communication capability either directly to the internet or to another device that is connected to the internet, in order to alert the homeowner or authorities that the alarm device has triggered. These smart alarm devices are normally increased in cost compared to the unconnected or non-smart version they are replacing. The investment by a homeowner or business owner for these new devices can be a significant cost.

Many dwellings, offices, and other fixed locations may now have a smart listening device (SLD) installed which functions as a "virtual assistant" in the form of a voice-controlled wireless speaker with an electronic interface to a cloud service and local peripherals. Example devices include the Amazon Echo and the Sonos® One (both of which use Amazon's Alexa Voice Service) and Google Home (which uses Google Assistant). These devices are being used to connect to a proliferation of smart home devices including Wi-Fi enabled smart alarm devices. While the smart alarm devices may usually communicate remotely with a user or an emergency services provider when a monitored event (e.g., smoke, carbon monoxide, or an intruder) is detected, an interface with the SLD can centralize and coordinate responses while increasing the detection and response capabilities.

The listening capabilities of an SLD can also enable a centralized/coordinated response to alarm devices/sensors which lack Wi-Fi or other remote capabilities. For example, an SLD can be trained to recognize the alarm sounds produced by non-networked alarm devices such as smoke alarms and to perform a desired notification or other response when the alarm sounds are detected. For training, a user can initiate an SLD programming mode via a button press or a voice command. With the SLD listening, the user manually triggers an alarm device (e.g., a doorbell or a smoke/carbon monoxide alarm) to emit its normal alerting sound. The SLD stores acoustical signatures in memory according to "tags" or label names as provided by the user. Any events with a sufficiently distinct acoustic signature could be recorded, labeled, and assigned to a responsive action. Example event triggers include security alarms, smoke detector, doorbell, CO alarm, knocking on an exterior door, a baby crying, sump pump shutoff or flood/high water audible alarms, unauthorized entry or attempted entry, garage door or entrance door opening, glass breaking, dog barking, floor squeaks, unrecognized voice (based on prior voice training), sound of running water (e.g., broken pipe), or running appliances (e.g., microwave, dishwasher, clothes washer, or dryer). Multiple SLDs in the home may be used in coordination to identify the location of the sound within the home through various triangulation techniques.

During a monitoring mode, the SLD can continuously listen for sounds and compare collected audio samples against the signatures stored in memory. The monitoring mode may be initiated by the user through voice commands, by setting a schedule, or by conditions (such as lack of sound for a period of time) that indicate that the user is not home, for example. Once a particular match is detected with a stored signature, a corresponding alerting action or other response can be taken automatically. These can include a notification sent to the user or other contacts as identified in advance using a contact method also configured in advance (e.g., a network push notification). Other actions can include using the SLD to generate a sound (e.g., a barking dog) or activating Wi-Fi-enabled lights to frighten away a possible intruder.

In some instances, desirable types of responses may require the availability of corresponding types of devices or hardware (e.g., cameras or other sensors, communication devices, or sound generators). Some desirable responsive actions may involve transporting-out an affected person from the dwelling where the alarm event occurs or transporting-in an emergency responder to the dwelling. It would be desirable to increase availability and rapidity of such responses.

SUMMARY OF THE INVENTION

The invention extends the alert/response capabilities of an SLD in novel ways which are cost efficient and provide significant improvements in safety and convenience. More specifically, monitoring and security features may be "crowdsourced" using cooperation among a local cluster of SLDs and/or vehicles to more effectively detect and respond to undesirable activity or events in an area (e.g., a neighborhood). Furthermore, deployment of resources and the movement of impacted persons to receive or render aid is enhanced as a result of the use of an autonomous vehicle.

When alerting events are detected, the invention involves responsive action which can be performed using various capabilities of one or more vehicles which are linked to a local cluster of SLDs. In particular, a vehicle may be an autonomous vehicle for which the responsive action can include autonomous-driving of the vehicle to a different location in order to extend the types of actions that are available.

In one aspect of the invention, a smart listening device comprises an audio detector responsive to speech and ambient sounds to provide digital audio signals. A distributed controller is coupled to the audio detector to execute responsive actions in response to the digital audio signals. A communications circuit establishes a first communication link with a backend. A database identifies 1) a cluster of other smart listening devices in a plurality of dwellings within a neighborhood region, 2) at least one user transport vehicle which is comprised of an autonomous vehicle, and 3) at least one responsive action corresponding to the autonomous vehicle. The distributed controller has a monitoring mode for detecting preconfigured alerting events and has an alert/response mode for executing responsive actions associated with the detected alerting events. The communications circuit establishes a second communication link with the autonomous vehicle when an executed responsive action is associated with a detected alerting event corresponding to the autonomous vehicle in order to initiate the responsive action. Furthermore, the responsive action includes commanding the autonomous vehicle to autonomously relocate to a designated location.

DETAILED DESCRIPTION OF PREFERRED EMBODIMENTS

Voice-controlled smart assistant systems which communicate with a backend system in order to deliver relevant information via synthesized voice signals or prerecorded media content and to initiate other actions such as controlling peripheral electronic devices are becoming increasingly popular. In some embodiments, a wakeword or activation sound is detected by the smart listening device, which then interprets/analyzes the incoming audio. In regard to speech control, a device constantly listens for a wakeword but is otherwise inactive. For alarm detection, a recognized audio signature may be acted upon without recognition of the wakeword.

Figure 1:
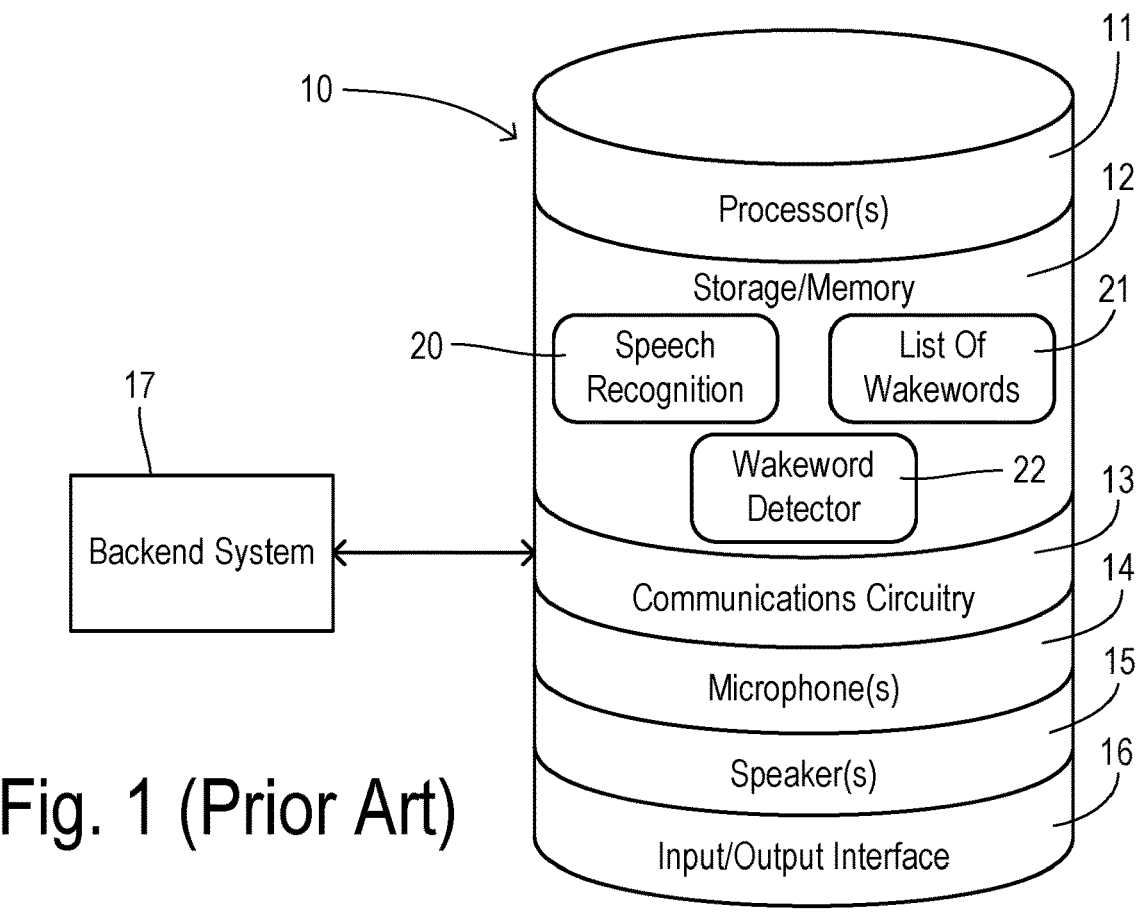
FIG. 1 is a block diagram showing a conventional smart listening device.

In FIG. 1, a voice-activated smart listening device (SLD) 10 includes processors or processing circuits 11, a memory/storage unit 12, communications circuitry 13, microphone(s) 14, loudspeaker(s) 15, and input/output interface 16. Communication circuitry 13 may include a wireless network interface controller for providing a Wi-Fi connection to a wireless router or other network access device that provides communication via the Internet to a backend system 17 (i.e., a cloud system). Communication circuitry 13 can alternatively or additionally include other wireless data platforms such as cellular telephone, Bluetooth®, Ultra-Wideband (UWB), or infra-red data channels to communicate with backend 17 or with peripheral devices and accessories. Input/output interface 16 may optionally include a power on/off switch, indicator lights, input buttons or keyboard, a graphical display, and/or a touchscreen.

Processors 11 and memory 12 are configured to control operations and functionality of SLD 10, including such functions as speech recognition 20 and wakeword detection 22 based on a list of stored wakewords 21 or sound profiles. As known in the art, speech recognition module 20 may include automatic speech recognition (ASR) and natural language understanding (NLU) converting spoken words into appropriate text using the detected audio. In a distributed control approach, the converted text may be sent to backend system 17 for processing. The digital audio data (e.g., MP3 data) containing speech or other sounds picked up by microphone(s) 14 may be streamed to backend system 17 so that analysis can begin on a user's request for information. Thus, backend system 17 can start analyzing whatever portion of the digital audio data is received in order to interpret the meaning of a user request and to eventually define an appropriate query. Then backend system 17 retrieves responsive information or actions which are communicated back to SLD 10. Speech recognition module 20 may also have a text-to-speech (TTS) component for converting text included within a response into speech sounds to be outputted by speaker(s) 15.

Figure 2:
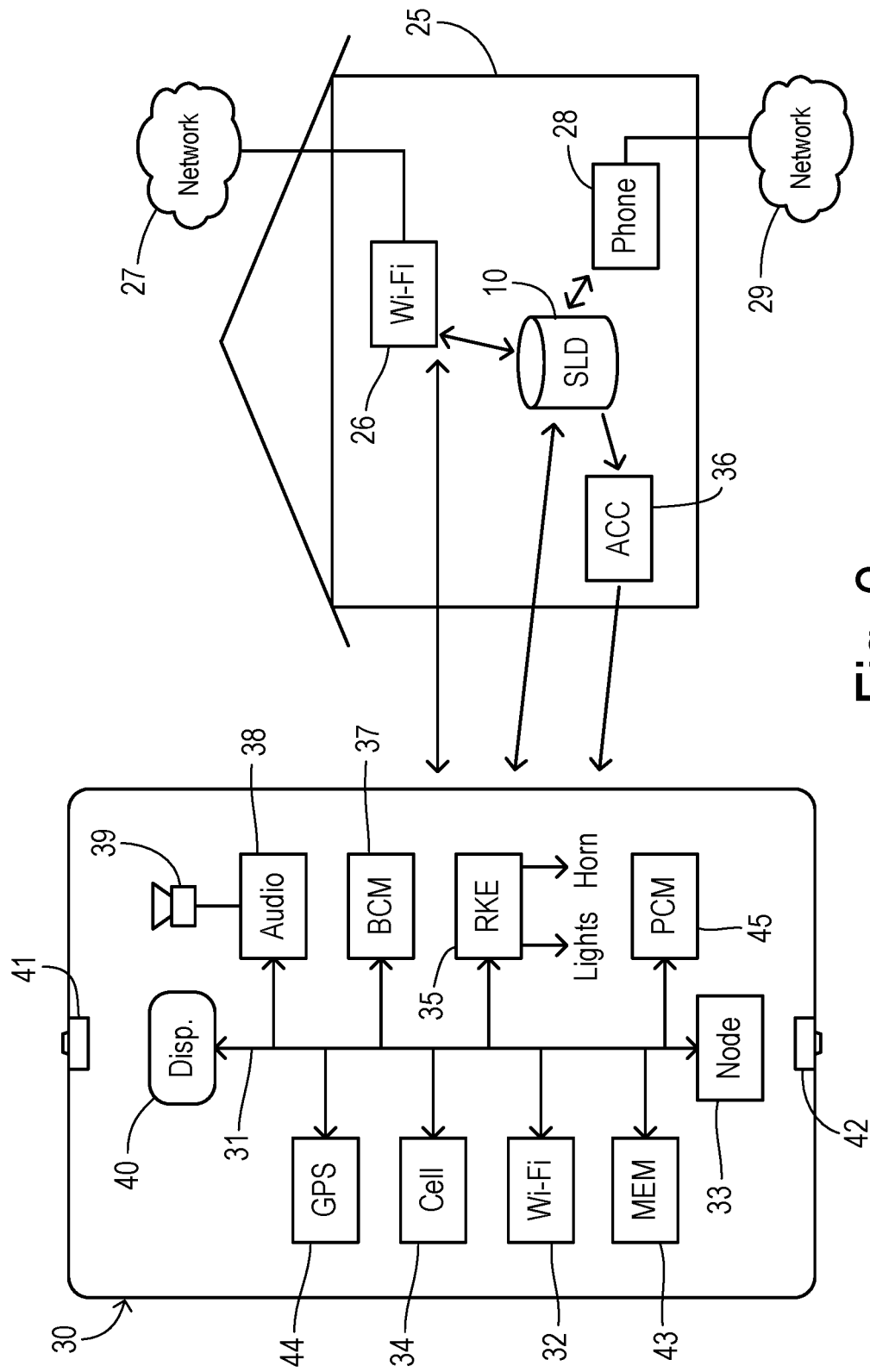
FIG. 2 is a block diagram showing interaction between an SLD and a transport vehicle for performing alerting/response actions.

FIG. 2 shows a typical scenario for deploying the present invention wherein an SLD 10 is used at a fixed location within a dwelling 25, such as a home or office. A Wi-Fi router 26 communicates with SLD 10 for establishing a first communication link to a cloud network 27. SLD 10 may include additional network interfaces, such as a cellular or land line phone instrument 28 to transmit data to and receive data via another network 29.

In the present invention, SLD 10 achieves expanded functionality and capabilities by interacting with a transport vehicle 30. Vehicle 30 may be a car, SUV, or truck of the same individuals who are residing in dwelling 25, for example. Vehicle 30 has an electrical system wherein various modules interact via a communication bus 31. By accessing devices on bus 31, the invention can obtain access to a wide variety of features and functions of vehicle 30 that may be useful in implementing actions and responses under control of SLD 10 in response to various preprogrammed events or alerts.

Vehicle 30 may preferably include a Wi-Fi module 32 connected with bus 31 via a gateway (not shown) in order to establish a second communication link via Wi-Fi between SLD 10 and vehicle 30 (e.g., through Wi-Fi router 26). Vehicle 30 may also include a Bluetooth node 33 and a cellular transceiver 34 which could also support a communication link with SLD 10, depending upon the distance between vehicle 30 and SLD 10. Via the established communication link, many useful actions or responses become available in connection with various triggering events detected at SLD 10 as described below.

Vehicle 30 may typically include a remote keyless entry/ security system (RKE) module 35 which receives RF signals from a remote key fob to control vehicle access and which can generate panic alarms and intrusion alarms by flashing vehicle lights and honking a vehicle horn, for example. When a monitored event is detected within dwelling 25 (whether directly detected by SLD 10 or by another smart device in communication with SLD 10) the affected area over which an alarm might be heard or noticed can be significantly increased by utilizing RKE system 35 of vehicle 30 to generate additional warning signs and sounds. As a result of conducting the necessary set-up within vehicle 30 and SLD 10 to allow a communication link and proper authentication between them (e.g., via Wi-Fi router 26 or Bluetooth® node 33), SLD 10 can execute a responsive action comprising the triggering of audible and visible vehicle alarms when SLD 10 detects a preconfigured alerting event that has been set-up to include that action.

SLD 10 may be interconnected with various accessories 36 which may include various smart sensors or smart alarm systems for detecting various conditions such as smoke or carbon monoxide and which may generate their own warnings or may interact with SLD 10 to generate alerts and other responses. Accessories 36 may also include additional wireless interfaces configured to interact with RF controlled systems in the vehicle such as RKE system 35. In other words, a transmitter of the type used in a vehicle key (e.g., in a key fob or Phone-as-a-Key) can be incorporated into an accessory unit 36 or built into SLD 10 which sends the normal RF command signals used by vehicle 30 (e.g., by issuing a panic alarm command to RKE module 35). In addition, accessories 36 may be used to recognize and relay an alarm condition occurring in the vehicle to the SLD to further extend the usefulness of the SLD to respond to vehicle conditions in situations where the audible recognition of the vehicle alarm is impaired.

Responsive actions executed by vehicle 30 can take many other forms by interacting with other vehicle systems such as a body control module (BCM) 37, an audio system 38 and loudspeaker 39, or a graphical display 40. For example, BCM 37 (or another module) can trigger an automatic cellular telephone call via cellular transceiver 34 to a remote assistance center or an emergency response provider. An automatic telephone call by the vehicle can be initiated in conjunction either with an audible alarm (generated by SLD 10 and/or vehicle 30) or without an audible alarm (e.g., a silent alarm that may have been generated by SLD 10 upon recognition of a "not safe" word spoken by a person facing an emergency in the dwelling, such as a home invasion). In another embodiment, the responsive action is comprised of notifying a user that an alerting event has been detected (e.g., by displaying a message on display 40 and/or synthesizing a voice message via audio system 38). As part of a notification, a two-way communication channel (e.g., an audio intercom) can be initiated between vehicle 30 and SLD 10 utilizing the communication link, thereby allowing the user in vehicle 30 to monitor an ongoing situation being detected by SLD 10 within dwelling 25.

In another embodiment, the vehicle 30 can be used as a device for collecting evidence when it is parked nearby dwelling 35 where a monitored event has been detected. For example, vehicle 30 includes forward and rearward cameras 41 and 42 which can be triggered to collect video signals to be recorded in a memory 43 which might capture events transpiring near dwelling 25 during a time of potential emergency. The recorded video could be later accessed in event reconstruction. The recording function may interact with a navigational GPS system 44 in order to tag recorded data with a geographic location and a time of day.

Vehicle 30 can also fulfill the role of a remote sensor (e.g., environmental sensor) to assist SLD 10 in evaluating various conditions being monitored. For example, a powertrain control module (PCM) 45 could be accessed in order to provide temperature data or humidity data used by SLD 10 to recognize alert conditions or select the best response to detected events. Other vehicle modules could also provide access to other important conditions, such as a body control module providing a vehicle security alarm trigger.

Figure 3:
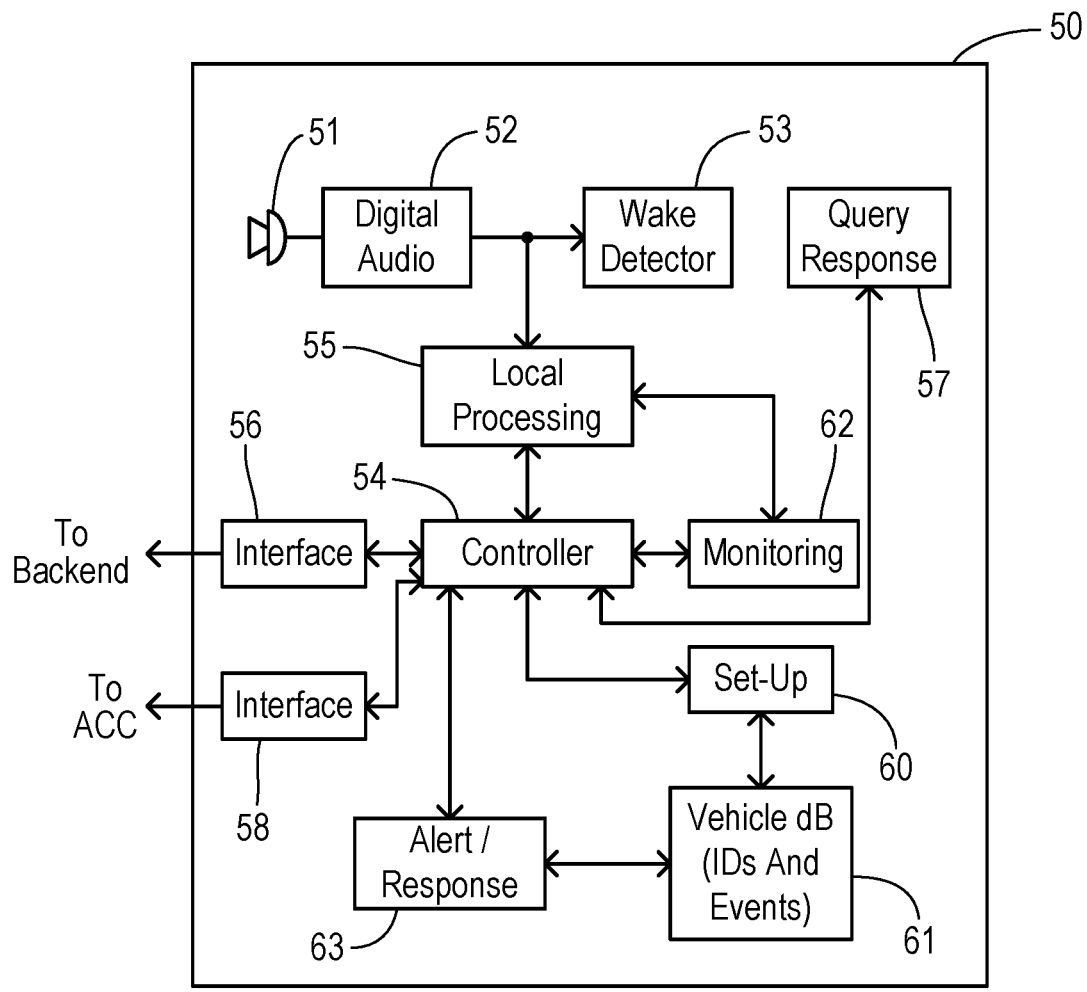
FIG. 3 is a block diagram showing an SLD configured for added features of the present invention.

FIG. 3 shows a modified SLD 50 adapted for implementing an alert system of the present invention. A microphone 51 receives spoken and ambient sounds which are converted to digital audio signals in a converter 52. The digital audio signals are monitored by a wake detector 53 for performing conventional voice interaction. The digital audio signals are also coupled to a local processing circuit 55 and a controller 54 in order to monitor for acoustic signatures stored in memory that are associated with monitored events such as audible alarms from smoke detectors, sounds of glass breakage, doorbell sounds, and others. Controller 54 is a distributed controller which is connected to an interface 56 for accessing a backend system as necessary for analyzing spoken requests as well as detecting acoustic signatures of monitored events and/or determining responsive actions to take for detected events. Controller 54 is connected to a query response block 57 which may include a speaker and other devices for providing spoken outputs or other responsive actions to the spoken commands from the user. Controller 54 is also connected to an interface 58 for interacting with various accessory devices including smart sensors interacting with SLD 50 via Wi-Fi.

In connection with the ability of the invention to execute responsive actions associated with a transport vehicle, SLD 50 includes a set-up mode or block 60 used to configure a vehicle database 61 for storing identifying information and event parameters that are used in executing vehicle responsive actions. A user accesses set-up mode 60 to configure database 61 with link data for establishing communication links to one or more vehicles and to configure database 61 with feature data for each vehicle which enables various vehicle interactions supporting the responsive actions desired by the user. For example, protocols would be established for accessing and authenticating various system functions within the vehicle such as turning on or off a panic alarm, activating camera recording for a particular length of time, or activating the streaming one-way or two-way communication signals. The vehicle feature data may include identification of available features and selectable parameter settings that may be available such as camera views to be recorded, etc.

SLD 50 includes a monitoring block 62 which continuously listens for preconfigured acoustic signatures and waits for alarm notifications from associated smart sensors. When a monitored event is detected, then an alert response mode 63 is accessed by controller 54 for generating the preconfigured responsive actions.

Figure 4:
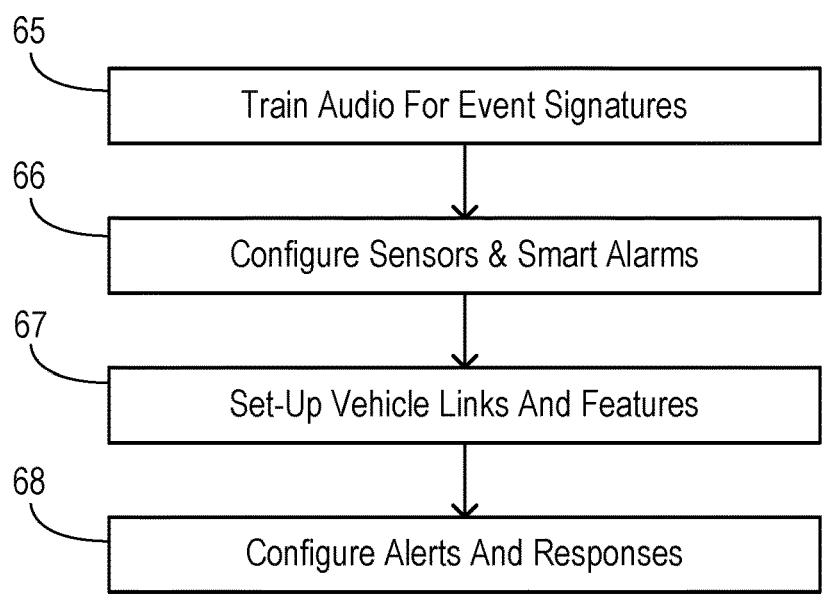
FIG. 4 is a flowchart showing one preferred method of the invention.

FIG. 4 shows a flowchart for the set-up mode. In step 65, the SLD is trained based on the sounds corresponding to selected "alerting events" which create a recognizable and consistent acoustic signature. The training comprises recording of training sounds into a stored signature which may be tagged with metadata identifying the event and specifying some responsive actions. In step 66, the SLD is optionally configured to work with smart sensors and/or smart alarm systems to coordinate responses and to expand the capabilities for monitoring the full circumstances surrounding any alerting events.

In step 67, one or more vehicle links and vehicle feature data are set-up by the user. The communication links may be specified according to the available communication channels (e.g., Wi-Fi network, RF transmitter frequency, Bluetooth® pairing, etc.), address information, and authentication credentials, for example. In step 68, responsive actions and alerts are configured for each potential alerting event associated with an identified vehicle so that they can be stored in the vehicle database within the SLD.

Figure 5:
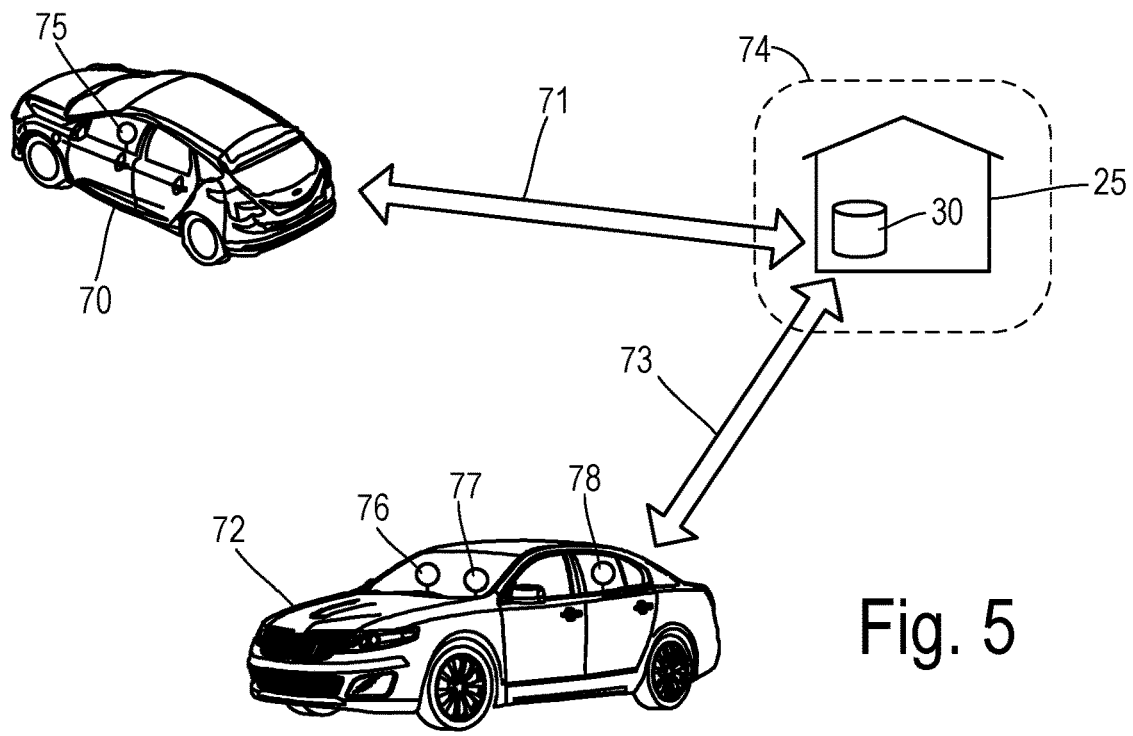
FIG. 5 is a diagram illustrating the tracking of registered vehicle and home occupants for automatic activation and deactivation of a monitoring mode.

The registration of individual vehicles within database 61 can also be used in connection with activating and deactivating the monitoring mode. This feature can also benefit from an expansion of the database to include registration of the identities (and communication links) of persons who are authorized occupants of the home. As shown in FIG. 5, the proximity of vehicles and home occupants can be assessed to detect times when the home is unoccupied. Vehicles 70 and 72 are associated with dwelling 25 and the typical occupants (e.g., residents) who are normally there. Vehicles 70 and 72 have communication links 71 and 73 with SLD 30 in dwelling 25. A proximity zone 74 is established around dwelling 25 covering an area where a vehicle or person would be considered to be "at home" or present at dwelling 25.

A person 75 occupies vehicle 70, and persons 76, 77, and 78 occupy vehicle 72. Vehicles 70 and 72 and people 75-78 and associated communication links are previously registered within a database in SLD 30. When all of people 75-78 are outside of zone 74, then SLD 30 can infer that dwelling 25 is unoccupied, and the absence of vehicles 70 and 72 from dwelling 25 can be helpful in determining the absence of the persons occupying them. For example, vehicles 70 and/or 72 can report their geographic coordinates to SLD 30 which then detects that vehicles 70 and/or 72 are outside zone 74. Each vehicle may identify its occupants (e.g., through various means of in-vehicle identification, such as phone pairing, voice-matching, facial recognition, or other biometric identification) and report this information to SLD 30. If all people who were previously registered to SLD 30 (e.g., all authorized occupants of a home) are found to be occupying a vehicle outside zone 74, then SLD 30 detects that dwelling 25 is now empty and it initiates the monitoring mode automatically. Similarly, SLD 30 automatically turns off the monitoring mode upon the return of a registered person and/or registered vehicle.

Knowledge of the locations of the registered vehicles and authorized residents of the dwelling is also useful for responsive actions during the alert/response mode. For example, when an alarm is triggered then the SLD can select the closest vehicle for sending a notification to a user.

Figure 6:
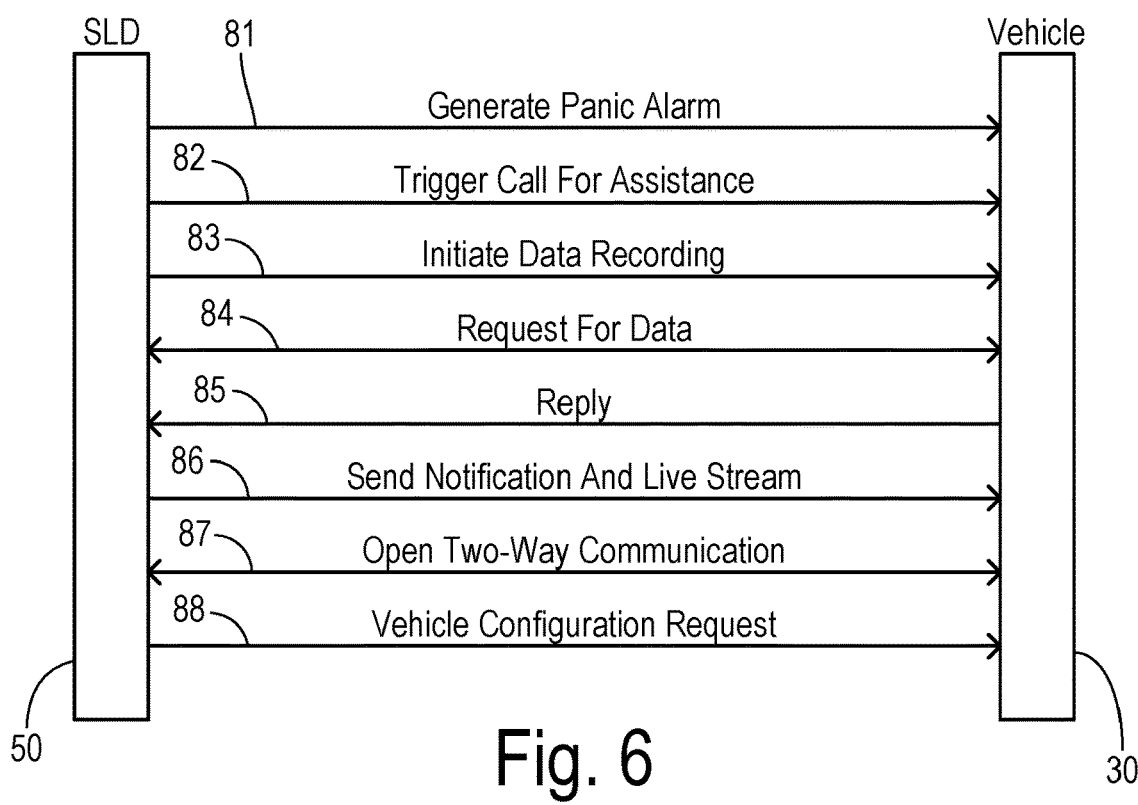
FIG. 6 is a diagram showing communication events between an SLD and a transport vehicle according to various embodiments of the invention.

FIG. 6 illustrates several embodiments of exchanges between SLD 50 and vehicle 30 over the communication link according to responsive actions/alerts executed in the respective embodiments. In one embodiment, a transaction 81 is comprised of signaling from SLD 50 to vehicle 30 which activates the panic alarm of vehicle 30. For instance, in response to the detection of an intruder or the detection of smoke or carbon monoxide, SLD 50 causes the vehicle panic alarm to generate an alerting sound that may be very perceptible not only in the dwelling where SLD 50 is located but also to adjoining areas and dwellings.

A transaction 82 is comprised of SLD 50 requesting that vehicle 30 activate a cellular phone-based emergency response system. Many vehicles are equipped with systems which automatically dial an emergency responder in the event of a vehicle crash. By triggering this feature in response to emergencies detected within the dwelling, valuable time can be saved in the arrival of emergency services.

A transaction 83 is comprised of a request from SLD 50 to vehicle 30 to initiate data recording for evidentiary purposes and event reconstruction. Data can include recorded video streams from vehicle-mounted cameras as well as audio recordings or the recording of vehicle environmental data.

In a transaction 84, SLD 50 may request various kinds of data from vehicle 30. During the monitoring mode, SLD 50 may request environmental data (e.g., captured video, audio, temperature, humidity, or other vehicle sensor data) useful in detecting and classifying monitored events. During the alerting/response mode, SLD 50 may request confirmation of the triggering of responses, for example. In a transaction 85, vehicle 30 provides replies to SLD 50 containing the requested data.

In a transaction 86, SLD 50 sends an alerting message to an occupant of vehicle 30 by way of a displayed text or synthesized speech. In addition, SLD 50 may live-stream audio and/or video signals to vehicle 30 to permit the occupant to more closely monitor activity in the dwelling. In a transaction 87, a responsive action may further include opening a two-way communication channel so that the vehicle occupant can communicate with a person in the dwelling.

In a transaction 88, SLD 50 may request vehicle configuration data from vehicle 30. In particular, such a request may occur during set-up mode so that a user can determine what response actions may be available. Thus, with little or no added expense, the functionality of an SLD-based monitoring/alerting system can be significantly enriched using capabilities of a user's transport vehicle which may or may not be located near the dwelling.

Additionally, a network of neighboring dwellings all having SLDs with similar capabilities may be used to recognize a vehicle intrusion alarm of a neighbor since one particular user's vehicle may be parked closer to a different neighbor's SLD instead of their own. Thus, an entire neighborhood network can provide a joint monitoring solution. More generally, a neighborhood cluster of SLDs and vehicles associated with a group of nearby dwellings can work cooperatively via either direct peer-to-peer interactions or as an interconnected network including a central, backend server that sets-up and manages the interactions.

Figure 7:
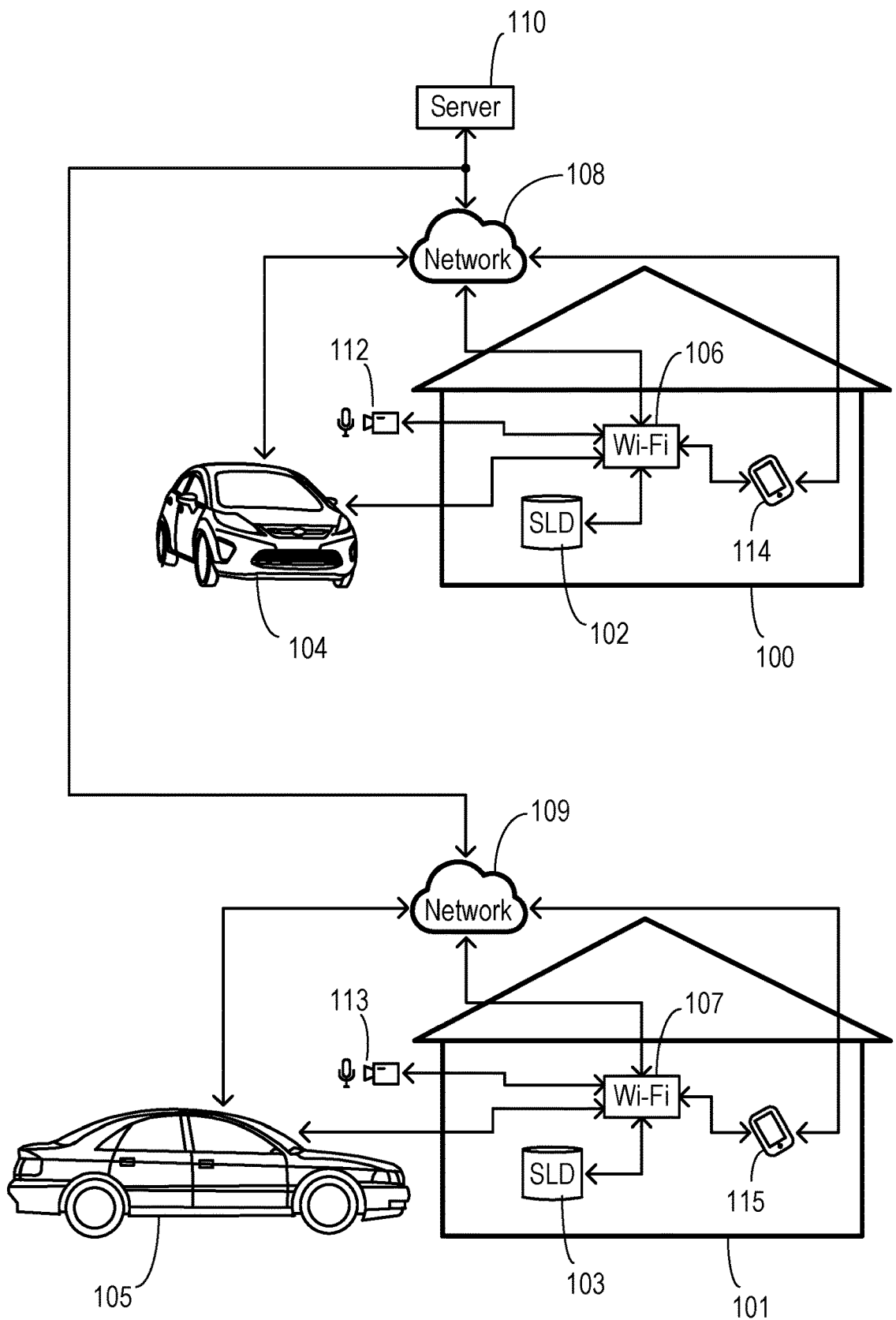
FIG. 7 is a block diagram showing a neighborhood cluster managed by a cloud server.

FIG. 7 shows an example cluster including dwellings 100 and 101 with SLDs 102 and 103, respectively. A vehicle 104 is associated with dwelling 100, and vehicle 105 is associated with dwelling 101. In each case, the vehicle may belong to an occupant/owner of the associated dwelling, for example. Dwelling 100 has a Wi-Fi access point (e.g., wireless router) 106 in wireless communication with SLD 102, a Wi-Fi node in vehicle 104, a fixed video/audio surveillance unit 112, and a mobile device 114 (e.g. cellphone). Router 106 is connected to a wide area network (WAN) 108 which is connected as part of the Internet or cloud. Vehicle 104 and mobile device 114 may also have a direct network connection into WAN 108 or other network with an interface to the Internet. WAN 108 is further connected to a server 110 which may be used for setup and operation of a cluster.

Dwelling 101 has a Wi-Fi access point (e.g., wireless router) 107 in wireless communication with SLD 103, a Wi-Fi node in vehicle 105, a fixed video/audio surveillance unit 113, and a mobile device 115. Router 107 is connected to a wide area network (WAN) 109 which is connected as part of the Internet or cloud. Vehicle 105 and mobile device 115 may also have a network connection into WAN 109 or another accessible network with an interface to the Internet. WAN 109 is further connected to server 110.

In addition to the network connectivity shown in FIG. 7, it is also possible to permit a vehicle associated with one dwelling to have a Wi-Fi connection to a Wi-Fi router in a different dwelling. This would enable an SLD of one dwelling to more directly communicate with a vehicle associated with another dwelling. If not configured in that way, communication between every SLD in a cluster with every vehicle in the same cluster can still be available through server 110 if the users participating in the cluster wish it.

The interoperation of the SLDs and vehicles in a cluster enables crowd sharing of the capabilities of each SLD and vehicle with other members of a cluster. For example, a user could configure their vehicle to be shared as a sensor (for collecting environmental data and sharing it with other cluster members) or as a warning device (to generate an alarm based on trigger events detected by other cluster members).

Figure 8:
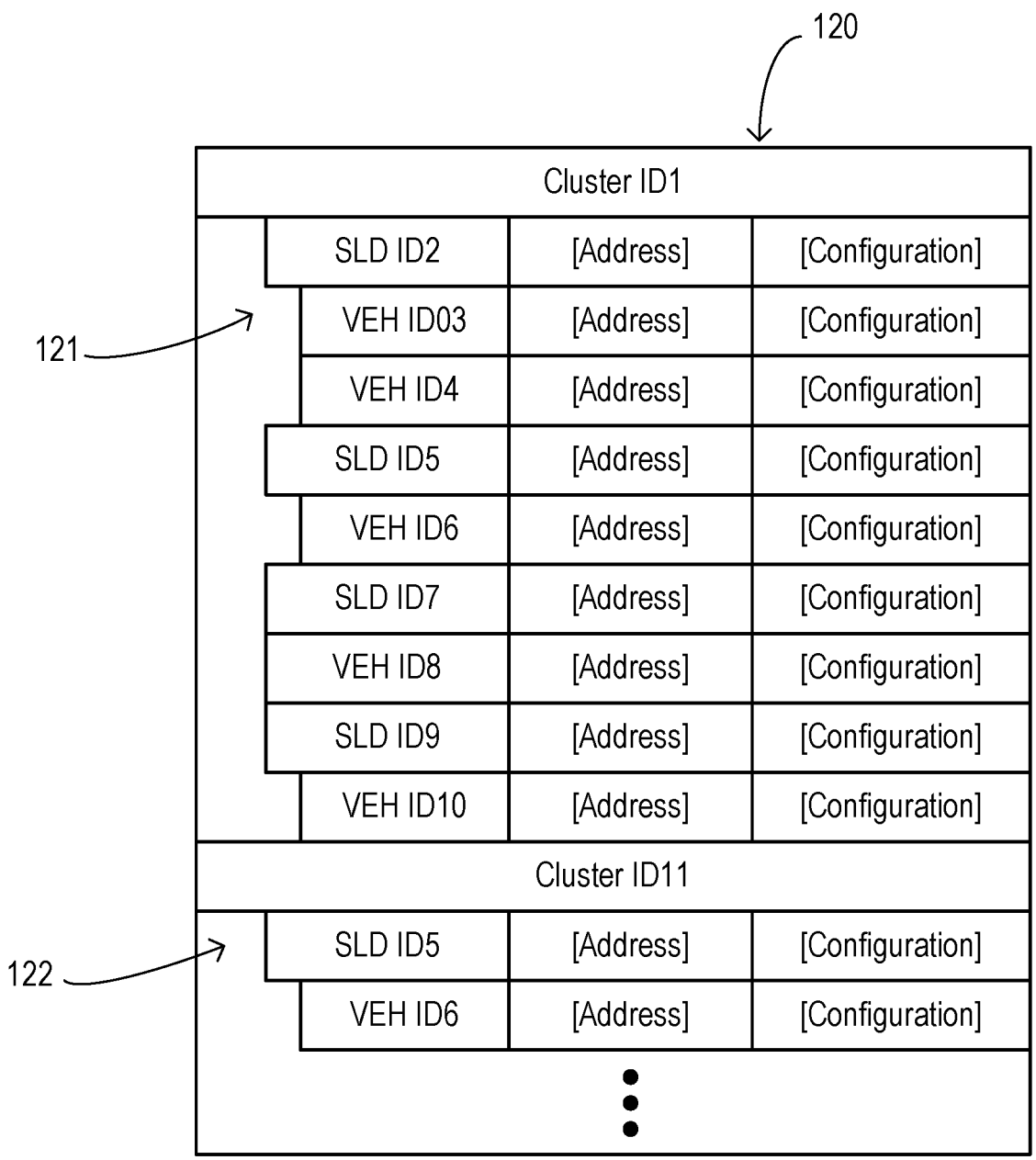
FIG. 8 depicts a cluster directory maintained by a cluster manager.

To setup and manage neighborhood clusters, server 110 may include a service module programmed to authenticate users, create directories of clusters and cluster members, define available interactions and features, provide memory for storing data collected by cluster members, and report alarm conditions to various response centers (e.g., police, fire, or health responders) among other management functions. FIG. 8 shows an example of a cluster directory 120 having memory blocks including a first memory block 121 storing a directory for a Cluster ID1 and a second memory block 122 storing a directory for a second Cluster ID11. For each SLD or vehicle in directory 120, a network address and configuration data may be stored. The configuration data may report the functional capabilities of the cluster devices and/or data that may be needed to access the functional capabilities. Directory 120 may show the relationships between SLD members and vehicle (VEH) members. For example, cluster ID1 includes an SLD ID2, and SLD ID2 may have subordinate vehicles VEH ID3 and VEH ID4. Depending upon the communication capabilities and the desired functions to be performed, SLDs can be cluster members without an associated vehicle (e.g., SLD ID7) and vehicles can be cluster members without an associated SLD (e.g., VEH ID8) provided each has a way to link to server 110 (e.g., using an app or skill executing on a networked device, such as an SLD, smartphone, or vehicle electronic module). In addition to entries for subordinate vehicles, directory 120 may also be expanded to include subentries for other devices that are members of a cluster such as a mobile device or camera installations. In this way, directory 120 enables increased functionality as a cluster grows over time.

Figure 9:
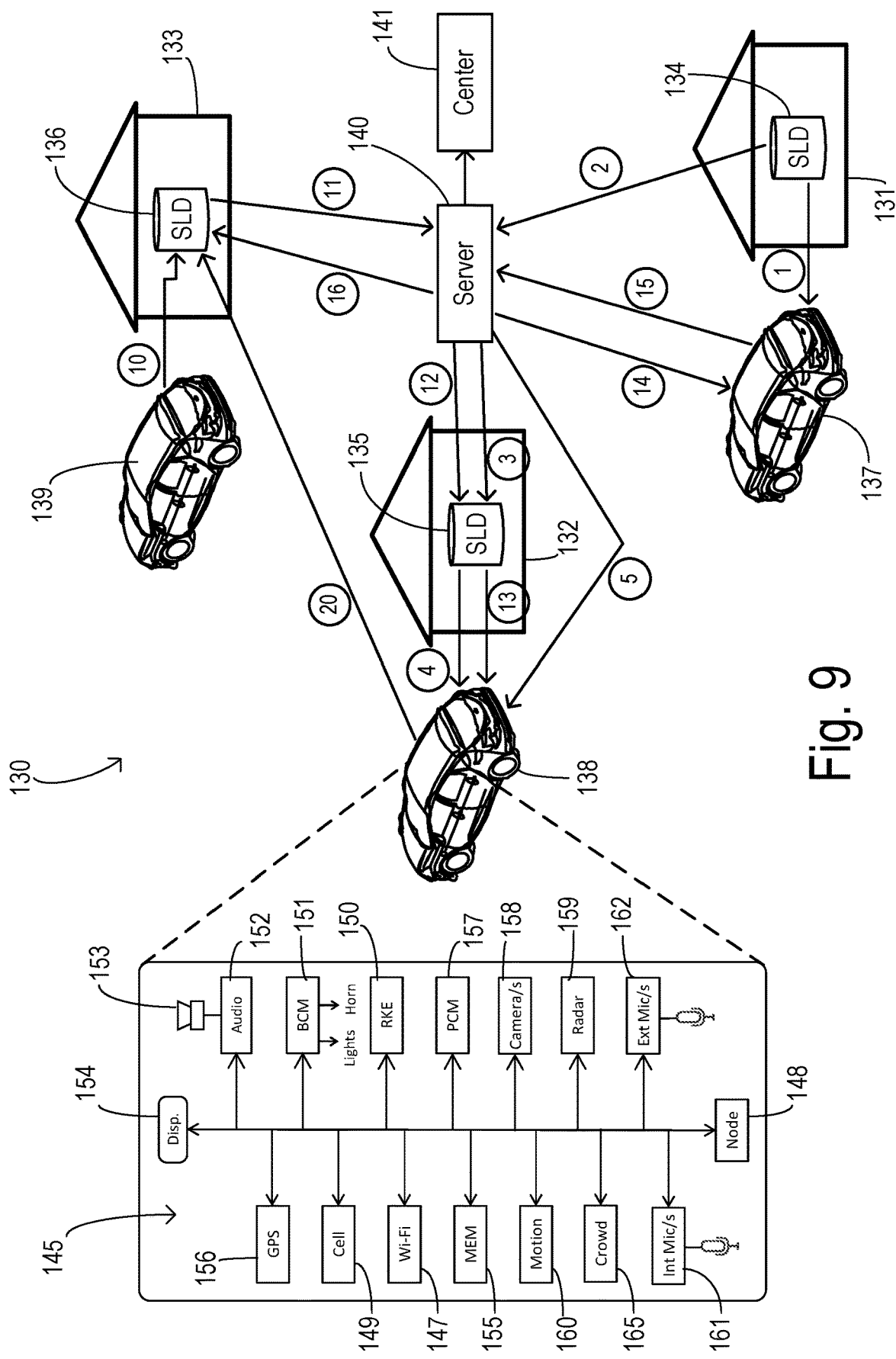
FIG. 9 is a block diagram showing interaction between cluster members.

FIG. 9 demonstrates some of the kinds of interactions that may occur between entities (i.e., SLDs and vehicles) in a configured neighborhood cluster 130. Cluster 130 has cluster members associated with dwellings 131, 132, and 133. Dwelling 131 has an SLD 134 and a vehicle 137 associated with it. Dwelling 132 has an SLD 135 and a vehicle 138 associated with it. Dwelling 133 has an SLD 136 and a vehicle 139 associated with it. SLDs 134-136 and vehicles 137-139 may interact with each other in at least a couple of ways, such as 1) directly with one another due to their close proximity (e.g., as a result of generated alarm sound being detected across dwelling boundaries or as a result of short-range wireless communication) and 2) mediated communication through cluster server 140. In connection with some security functions of the cluster, server 140 may communicate with a response center 141 such as medical, fire, or police first responders, security services, or insurance companies.

Portions of an electrical architecture 145 interconnected on a bus 146 are shown for vehicle 138. A Wi-Fi module 147 is connected with bus 31 to provide a communication link to one or more SLDs. A Bluetooth node 148 and a cellular transceiver 149 support additional communication links. A remote keyless entry/security system (RKE) module 150 together with a BCM 151 can generate panic alarms and intrusion alarms by flashing vehicle lights and honking a vehicle horn, for example. The alarms lights and sounds could be detected by one or more SLDs in cluster 130 to trigger a response, or any particular vehicle in cluster 130 could be commanded to initiate an alarm by events detected at other vehicles and any SLD in the cluster. Vehicle 138 further includes an audio system 152 with loudspeaker 153 and a graphical display 154 of a human machine interface (HMI). Vehicle 138 includes cameras 158 capturing video signals that may be recorded in a memory 155 (and further transmitted to server 140 and/or response center 141). A GPS system 156 may provide a geographic location and a time of day to tag the recording.

Vehicle 138 has a PCM 157 to sense temperature data, humidity data, or other environmental variables to support detection of events of interest. Other components for monitoring the vehicle surrounds can include a radar 159, motion sensor 160, internal microphone 161, and external microphone 162. Vehicle 138 includes a crowd-sourcing module 165 which is programmed for the setup and operation as a cluster member. Module 165 may be a standalone module or may be implemented using one or more electronic modules already present in a vehicle, such as a network gateway module (not shown) or cellular transceiver module 149 or BCM 151, for example. Module 165 handles configuring communication links with one or more SLDs and with cluster server 140 (e.g., via its base SLD 135). Module 165 is further programmed to identify its relevant capabilities to the linked SLDs.

Once cluster 130 is sufficiently configured, various crowd-sourcing interactions are supported. For example, when SLD 134 in dwelling 131 detects an alerting event, it may send an alert message ① to vehicle 137 to initiate an alarm response. Simultaneously, SLD sends a message ② to server 140 in order to initiate additional responses and/or to inform other cluster members of the alerting event. In response, server 140 sends a message ③ to SLD 135 which relays a message ④ to vehicle 138 to initiate an additional alert response. If so configured, server 140 could alternatively send an alerting message ⑤ directly to vehicle 138.

In a different scenario, vehicle 139 detects some kind of a trigger event and sends an alerting message ⑩ to its associated SLD 136. In addition to taking any appropriate local action, SLD 136 sends a message ⑪ to server 140 in order to initiate a crowd-sourced response to the event or to gather additional information to facilitate analysis of a potential event. Server 140 sends a message ⑫ to SLD 135 as either a source of additional information or as an agent to elicit further responsive actions, including sending a message ⑬ to vehicle 138 to obtain involvement of its resources. If so configured, server 140 can link directly with other local vehicles. For example, a direct message ⑭ is additionally sent to vehicle 137 which can respond with a message ⑮. Thus, server 140 can coordinate the gathering of surveillance and the response to any detected situations.

As described above, a security alarm generated by a vehicle at one dwelling could be detected (i.e., heard) by an SLD at a different dwelling and acted upon by that SLD. Similarly, a vehicle of one user (homeowner of a dwelling with an associated SLD) can be configured to link directly with an SLD of a different user (a different homeowner). For example, vehicle 138 can be configured to communicate with a Wi-Fi access point of dwelling 133 in order to send a message ⑳ to SLD 136.

Figure 10:
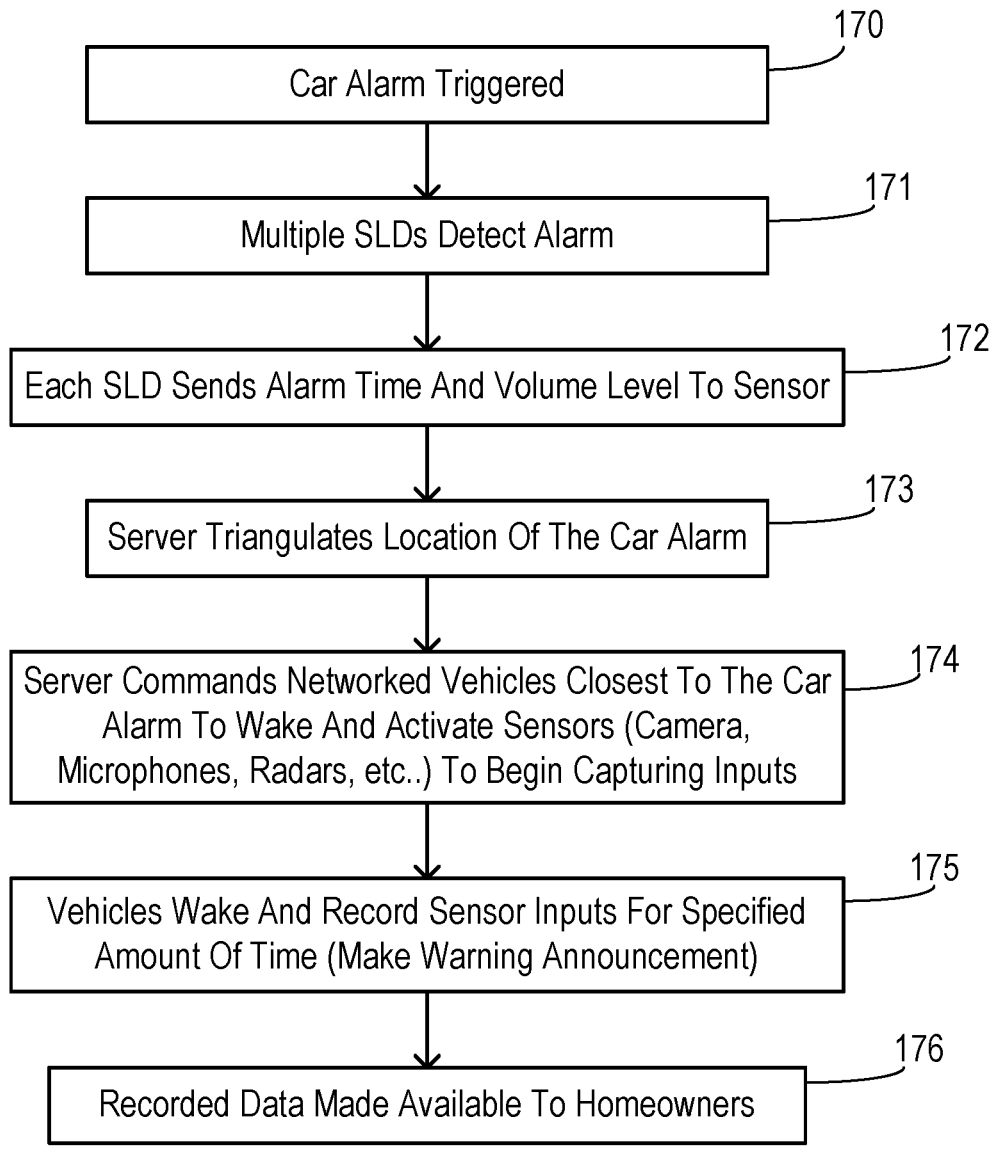
FIG. 10 is a flowchart showing a cluster response to a car alarm.

FIG. 10 shows one embodiment of a method for crowdsourcing of vehicles and SLDs in a cluster. In step 170, a car alarm is triggered in a vehicle present in a neighborhood for which a cluster has been created. In this instance, the vehicle need not be configured for wireless communication in the cluster. In step 171, multiple SLDs in the cluster detect the car alarm (e.g., by detecting the associated sound). Each SLD that detects the sound sends a message to the cluster server to identify the time of the alarm and the volume level at which the alarm sound was detected. Based on the relative sound levels reported to it and on the known GPS location of the SLD, the server triangulates the location of the car alarm in step 173. In step 174, the server commands networked vehicles in the cluster closest to the triangulated location to wake up and to activate their sensors for monitoring the surroundings. In step 175, the clustered vehicles wake up and start recording sensor data (e.g., camera images, sounds, and radar tracking of objects) for a specified time. To deter undesirable activities, the vehicles may also generate visible or audible warnings or audible warning announcements. In step 176, recorded data can be sent to the server and/or made available to homeowners in the cluster.

Figure 11:
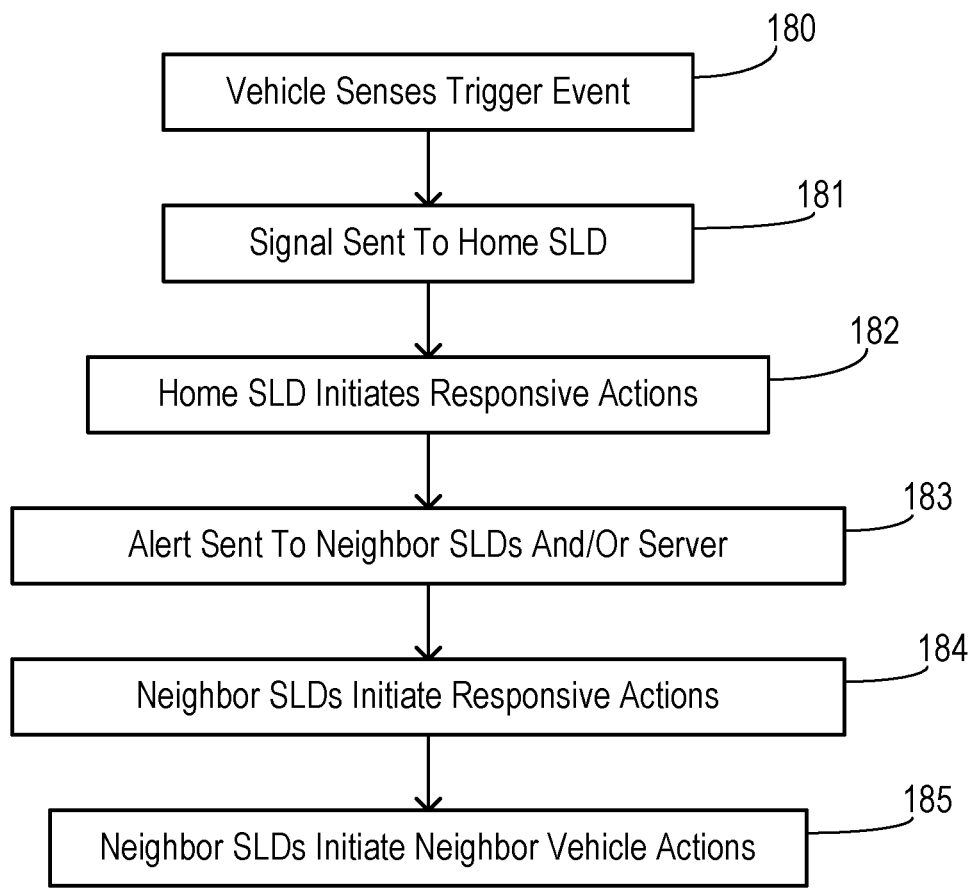
FIG. 11 is a flowchart showing a method for operating a cluster.

FIG. 11 shows another method wherein a vehicle which is performing continuous monitoring for various trigger events senses an event in step 180. An alerting signal or message is sent to its home SLD in step 181. In step 182, the home SLD initiates associated responsive actions (e.g., according to any of the security actions described herein and others). In order to obtain crowd-sourced assistance, an alert message or messages are sent by the home SLD to neighboring SLDs in the cluster and/or to the cluster server in step 183. In step 184, neighbor SLDs initiate their own responsive actions (e.g., providing a notification to dwelling occupants of the event). In step 185, the neighbor SLDs may also transmit messages to their respective vehicles in initiate vehicle responses in the neighbor vehicles.

By combining various enabling technologies like adaptive cruise control (ACC), lane keeping assistance (LKA), electronic power assist steering (EPAS), adaptive front steering, parking assistance, antilock braking (ABS), traction control, electronic stability control (ESC), blind spot detection, GPS and map databases, vehicle-to-vehicle communication, and others, a vehicle can be operated autonomously (i.e., with little or no intervention by a driver or even without a driver present). When a vehicle included in a cluster has autonomous capabilities, the vehicle-based responsive actions taken for certain trigger events can utilize the added self-driving capabilities.

Figure 12:
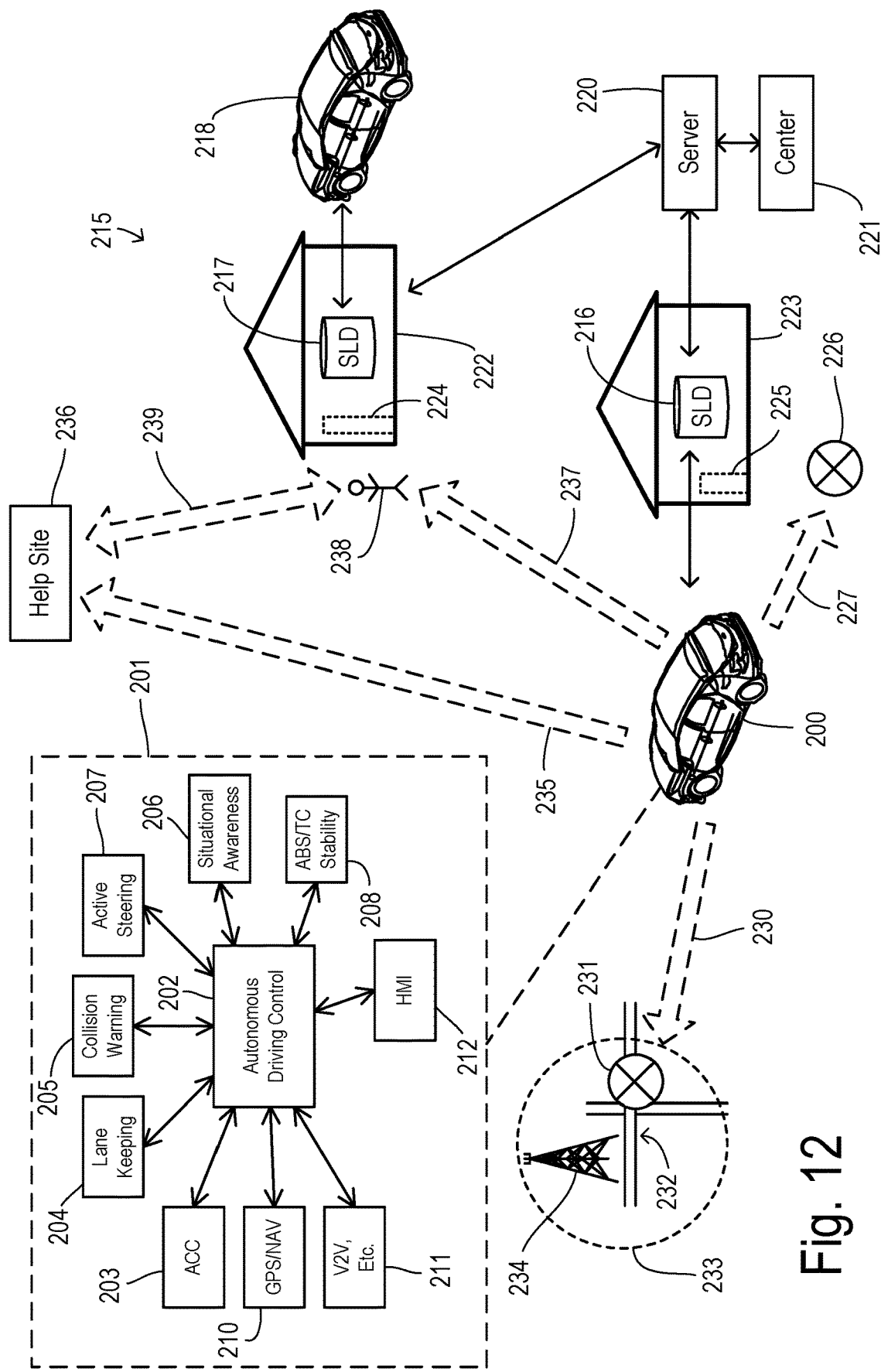
FIG. 12 is a block diagram showing interaction between cluster members including an autonomous vehicle.

FIG. 12 shows an autonomous vehicle 200 which is a member of a cluster. Vehicle 200 has an autonomous system 201 which may include an autonomous driving controller 202 coordinating operation of a plurality of subsystems to obtain autonomous vehicle functioning. For example, an adaptive cruise control (ACC) module 203 preferably provides a "stop and go" function capable of controlling vehicle forward movement in response to both a leading vehicle and traffic control devices such as stop signs and traffic lights. ACC module 203 is coupled to an engine or powertrain control unit (not shown) for accelerating and decelerating the vehicle. A lane keeping module 204 may preferably include the functionality of a lane departure warning system and/or a lane-keeping assistance system. A collision warning system 205 may preferably include forward, side, and rearward looking radar sensors and/or cameras providing data to an object identification and tracking system as known in the art. Collision warning system 205 may work together with other remote sensing components in a situational awareness block 206 to identify fixed or moving obstacles or other hazards.

An active steering subsystem 207 responds to commands from autonomous driving control 202 for changing a vehicle heading (e.g., to make turns or to follow a desired lane). Slowing or stopping of the vehicle is provided by a braking system 208 which may include ABS and/or stability control subsystems.

A GPS and navigation unit 210 is coupled to autonomous driving control 202 for providing vehicle position, speed, and heading information. A map database is stored within GPS unit 210 or is remotely accessed by GPS unit 210 (e.g., over a wireless data connection) for route planning and monitoring. Other remote information can be accessed wirelessly using a vehicle-to-vehicle (V2V) system 211, for example. As previously described, vehicle 200 includes wireless communication devices (e.g., cellular data, Wi-Fi, Bluetooth®, UWB, and/or other RF services) for communications within its assigned cluster. A human-machine interface (HMI) 212 coupled to autonomous driving control 202 has push buttons, dials, voice activated systems, or other inputs to obtain driver input (e.g., when updating a trip destination and/or route) and having a graphic display to provide driver feedback.

FIG. 12 illustrates some responsive actions which can be executed using autonomous vehicle 200. A cluster 215 includes vehicle 200 along with a non-autonomous vehicle 218 and SLDs 216 and 217 in dwellings 222 and 223, respectively. The members of cluster 215 communicate with cluster server 220 and response center 221. Dwellings 222 and 223 have remote controlled entry systems (e.g., garage door openers) 224 and 225 which can preferably be activated by the corresponding SLDs or vehicles to facilitate entering or exiting the dwelling when transporting a person as described below.

Upon the occurrence of an alerting event (e.g., a loud crashing sound or sounds of an intrusion) detected by a cluster member, a location of the sound obtained by triangulation might not be close to the cameras or other sensors available to the cluster members. For example, a location of interest 226 may be identified. In order to better investigate the details of the altering event, a responsive action may include commanding autonomous vehicle 200 to relocate to a designated location (e.g., at or adjacent to location of interest 226) via a commanded autonomous path 227. The responsive action may further include instructions to activate a sensor (e.g., camera and/or microphone) contained in autonomous vehicle 200 when the autonomous vehicle arrives at the designated location, and disseminate data gathered by the sensor(s) regarding the detected alerting event to server 220, center 221, or any members of cluster 215. Use of autonomous vehicle 200 may be restricted to actions initiated in connection with the vehicle owner's respective dwelling or can be made available for actions initiated at other dwellings or in other vehicles if appropriate permissions have been put in place.

In another type of responsive action, autonomous vehicle 200 may be relocated to other designated locations based on performing other functions. For example, autonomous vehicle 200 may be commanded to relocate to a designated location 231 (e.g., via a commanded autonomous path 230 or via a self-determined path) in an instance in which it is desired to send a wireless message concerning the alerting event to a remote recipient, but an appropriate wireless link is currently unavailable to the cluster members. Location 231 may be known to be within an effective transmission range 233 of a cellular base station 234. Consequently, the responsive action may further include instructions to transmit a predetermined wireless message to a predetermined recipient when the autonomous vehicle arrives at the designated location. In another example, location 231 may be on a road 232 leading to an identified alerting event for which it is desirable to inhibit access to or from the site of the event (e.g., a crash or a fire). Autonomous vehicle 200 can be dispatched to location 231 for the purpose of blocking off at least a portion of road 232, for example. While at location 231, vehicle 200 can be further instructed to gather data and to disseminate it to server 220, center 221, or any members of cluster 215.

In another type of responsive action, autonomous vehicle 200 may be used to transport a person involved with the detected alerting event to or from the designated location. As shown, autonomous vehicle 200 may be associated with dwelling 223 (e.g., by common ownership). When an alerting event occurs in connection with dwelling 223 involving the need for medical or other attention for a person located in dwelling 223, a responsive action may include commands for placing the person within vehicle 200 (e.g., by operating garage door 225 and monitoring entry into vehicle 200) and then commanding autonomous vehicle 200 to relocate to a help site 236 (e.g., hospital or police station) via a commanded autonomous path 235. When appropriate permissions have been documented, vehicle 200 can also execute trips involving persons at other locations (e.g., at a different dwelling in the cluster).

A database for cluster 215 may indicate that a dwelling (e.g., dwelling 222) is without an autonomous vehicle and that an autonomous vehicle (e.g., vehicle 200) associated with another one of the dwellings is authorized to provide responses for the first dwelling. In that case, a responsive action may include commands for relocating vehicle 200 from dwelling 223 to dwelling 222 along an autonomous path 237, placing a person 238 within vehicle 200 (e.g., by commanding SLD 217 to operate garage door 224) and then commanding autonomous vehicle 200 to relocate to help site 236 via a commanded autonomous path 239. In another example, the person to be relocated can be a person who renders aid (e.g., a friend or an agent of an emergency service provider such as a nurse or security personnel) and who is at a remote location. Thus, a responsive action may include commands for relocating vehicle 200 from dwelling 223 to help site 236 along autonomous path 235, placing the agent within vehicle 200, and then commanding autonomous vehicle 200 to relocate to a dwelling (e.g., dwelling 222) via commanded autonomous path 239.

Figure 13:
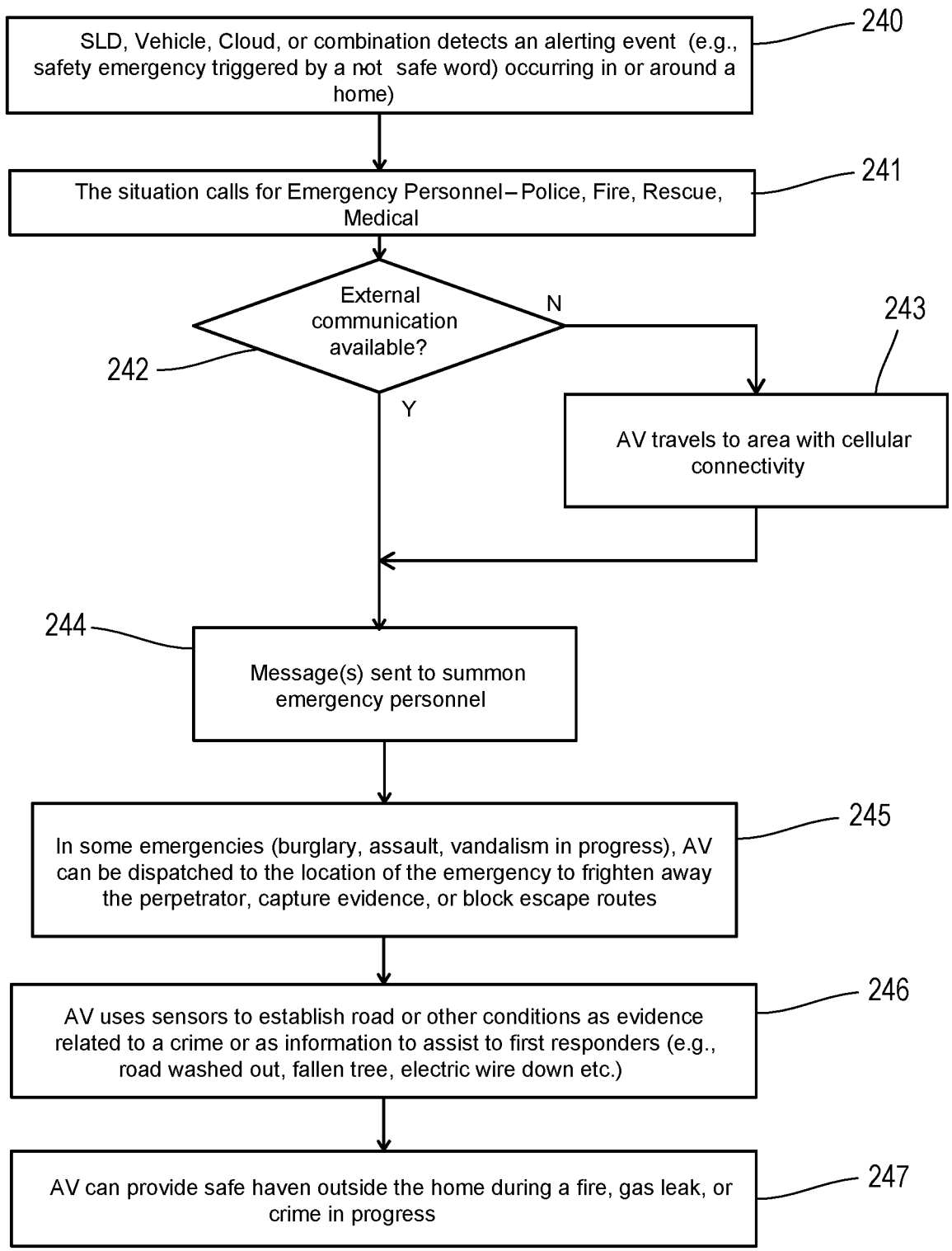
FIG. 13 is a flowchart showing a method in which a response to an alerting event includes dispatching an autonomous vehicle.

FIG. 13 shows a flowchart of an example method of operating the invention. In step 240, a cluster member (e.g., SLD or a vehicle system) or another entity linked via a Cloud network to the cluster detects an altering event. For example, a person in a dwelling within the cluster may utter a "non-safe" word to the SLD indicating an emergency in or around the dwelling. In step 241, one or more responsive actions are ascertained which have been predesignated for the alerting event. For example, the situation may call for requesting assistance from emergency personnel, such as police, fire, rescue, or medical responders. A check is performed in step 242 to determine whether external communication (e.g., cellular connectivity) is available for contacting the responder(s). If not, then the autonomous vehicle may be sent to an area with cellular connectivity in step 243. In step 244, the appropriate messages are automatically sent to summon the emergency personnel.

In the method of FIG. 13, additional actions may be taken. In some types of emergencies such as burglary, assault, or vandalism, the autonomous vehicle can be dispatched to the location of the emergency (if not already there) in step 245 and then take actions in order to frighten away a perpetrator, capture evidentiary data, or block an ingress or egress route. In step 246, whenever it relocates during a responsive action, the autonomous vehicle can also activate its sensors and record/transmit resulting data relating to various environmental conditions (e.g., road conditions) as evidence related to the emergency to assist the responders when responding. In step 247, the autonomous vehicle can also be commanded to relocate during actions to use the vehicle as a safe haven for the affected person(s) which can move away from the site of the emergency.

Figure 14:
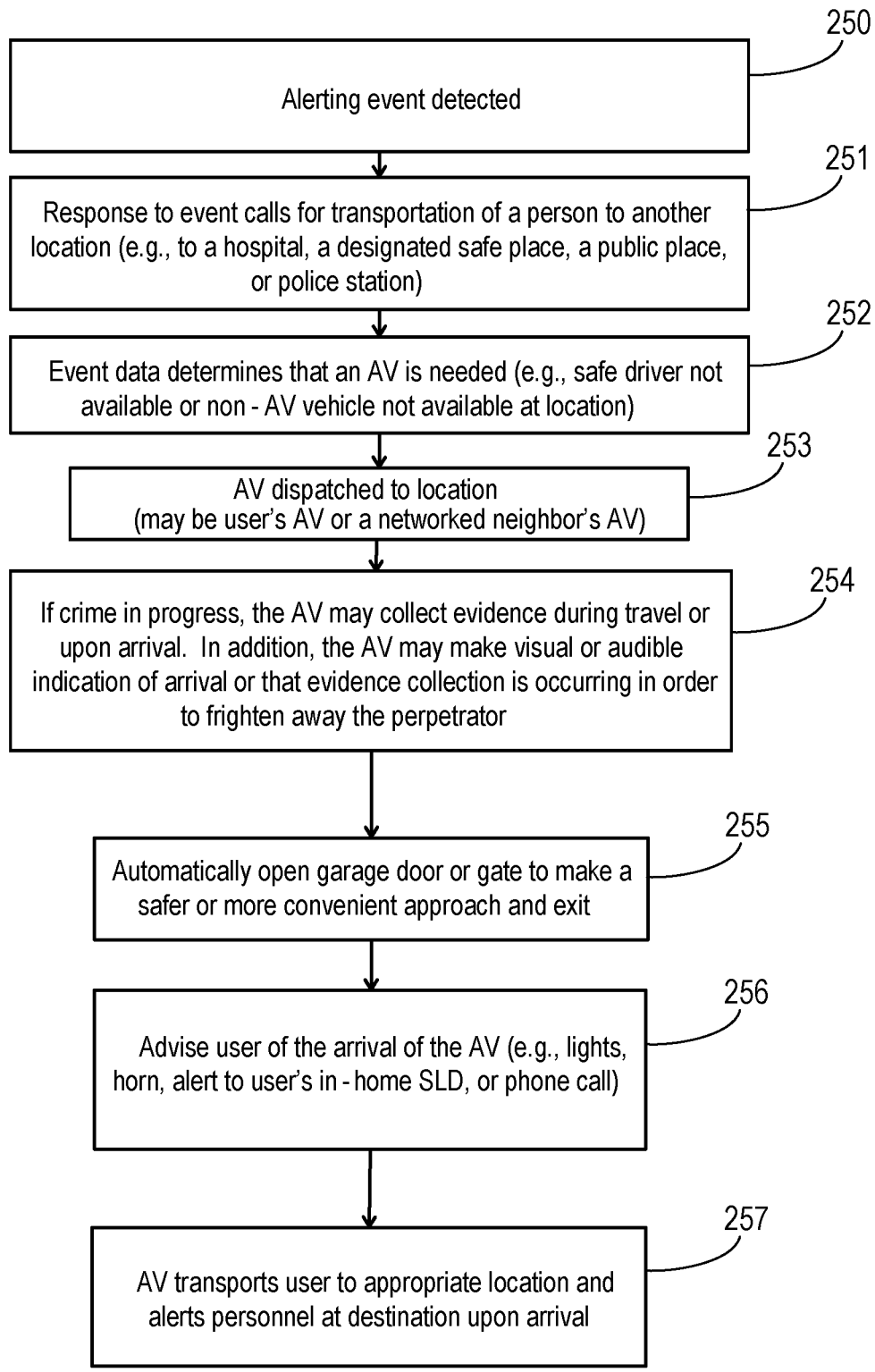
FIG. 14 is a flowchart showing another embodiment of a method in which an autonomous vehicle is dispatched to transport a person.

FIG. 14 shows another method wherein an alerting event is detected in step 250. In step 251, it is determined that the response to the alerting event calls for the transportation of an impacted person (e.g., occupant of the dwelling) to another location for assistance (e.g., to a hospital, designated safe place, public place, or police station). In step 252, the method determines whether an autonomous vehicle is needed or whether other transportation is available. For example, the autonomous vehicle may be needed when either a qualified driver (e.g., a licensed driver without any incapacity caused by the emergency) is not available and/or a non-autonomous vehicle is not available. When a determination to use the autonomous vehicle is made, then it is dispatched to the location of the distressed person in step 253. The person being assisted can be a member of a household to which the autonomous vehicle relates, or can be an occupant of a neighbor's dwelling which is included in the cluster.

In the event that a crime or other emergency is in progress, the autonomous vehicle may collect evidentiary data in step 254 during the travel phase or upon arrival. In order to potentially frighten away a perpetrator, the autonomous vehicle may make visual or audible indications of its arrival and/or an indication that it is collecting surveillance data. If the appropriate set-up has been performed, the instructions for relocating to a dwelling for picking up a person may include automatically opening or closing a garage door or gate in step 255 in order to provide a more convenient egress or ingress at the dwelling. The person(s) in the dwelling or vehicle is advised of the arrival of the autonomous vehicle in step 256 by flashing vehicle lights, honking the horn, sending an alert message to the user's SLD, or sending a message to the user's phone. The user enters the autonomous vehicle and is transported in step 257 to the appropriate location, where the autonomous vehicle alerts personnel at the destination to the arrival.

Figure 15:
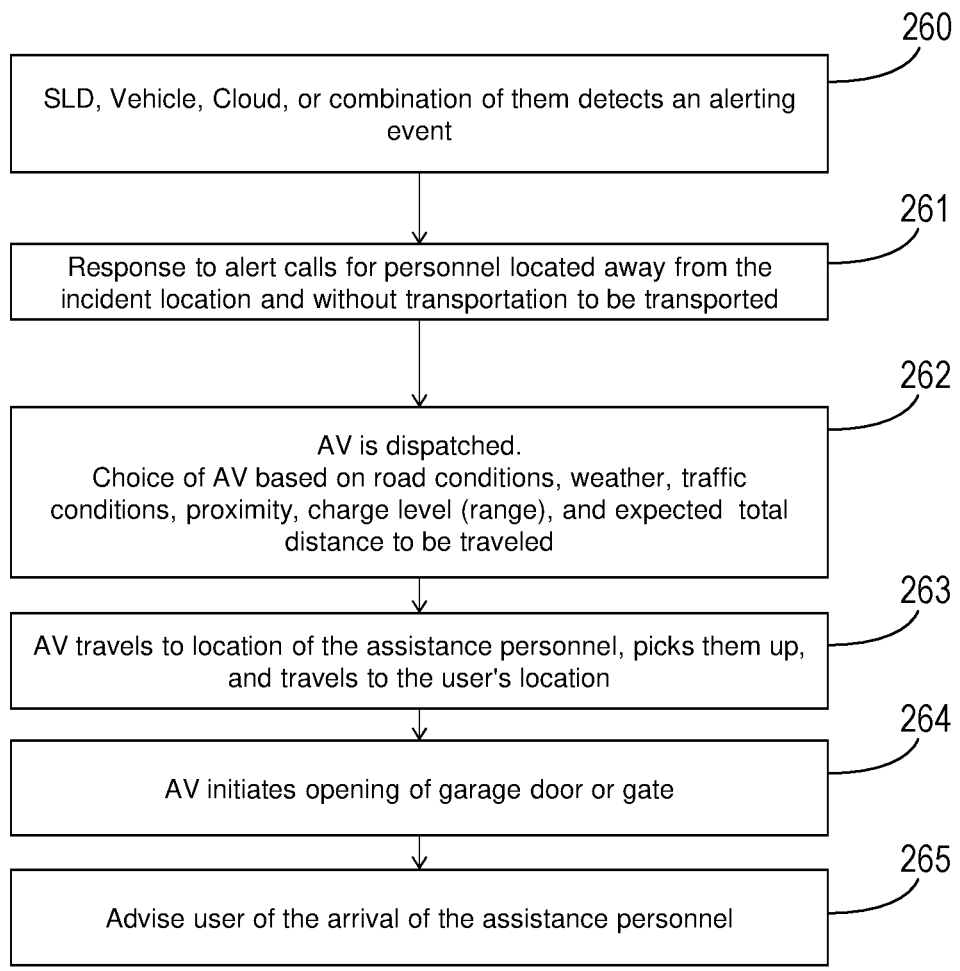
FIG. 15 is a flowchart showing another embodiment of a method in which a person is transported.

In FIG. 15, another embodiment of a method of the invention begins in step 260 with the detection of an alerting event by the SLD, a vehicle, a Cloud-based entity, or a combination of them. In step 261, it is determined that the particular alert calls for personnel located away from the site of the incident to be transported to that site to render aid (e.g., an emergency responder is needed who does not have separate access to transportation). In step 262, the autonomous vehicle is dispatched to a location where the responder is currently located. Selection of an autonomous vehicle to be used when more than one autonomous vehicle is made available may differentiate among the possible choices based on proximity of the vehicles, road conditions, weather, traffic conditions, charge level (e.g., range) of electric vehicles, and/or total expected travel distance. A chosen vehicle travels to the location of the assistance personnel in step 263 to pick them up and take them to the user's location. Upon arrival at a dwelling, a garage door or gate may be automatically opened in step 264 to facilitate entry by the responder. In step 265, a message may be sent to the user in order to advise them of the arrival of the assistance personnel.

What is claimed is:

1. A smart listening device comprising:
  an audio detector responsive to speech and ambient sounds to provide digital audio signals;
  a distributed controller coupled to the audio detector to execute responsive actions in response to the digital audio signals;
  a communications circuit establishing a first communication link with a backend; and
  a database identifying 1) a cluster of other smart listening devices in a plurality of dwellings within a neighborhood region, 2) at least one user transport vehicle which is comprised of an autonomous vehicle, and 3) at least one responsive action corresponding to the autonomous vehicle;
  wherein the distributed controller has a monitoring mode for detecting preconfigured alerting events and has an alert/response mode for executing responsive actions associated with the detected alerting events;
  wherein the communications circuit establishes a second communication link with the autonomous vehicle when an executed responsive action is associated with a detected alerting event corresponding to the autonomous vehicle in order to initiate the responsive action; and
  wherein the responsive action includes commanding the autonomous vehicle to autonomously relocate to a designated location.

2. The device of claim 1 wherein commanding the autonomous vehicle to autonomously relocate to a designated location further comprises instructions to (i) activate a sensor contained in the autonomous vehicle when the autonomous vehicle travels to or when it arrives at the designated location, and (ii) disseminate data gathered by the sensor regarding the detected alerting event.

3. The device of claim 1 wherein commanding the autonomous vehicle to autonomously relocate to a designated location further comprises instructions to transport a person involved with the detected alerting event to or from the designated location.

4. The device of claim 1 wherein commanding the autonomous vehicle to autonomously relocate to a designated location further comprises instructions to transmit a predetermined wireless message to a predetermined recipient when the autonomous vehicle arrives at the designated location.

5. The device of claim 1 wherein the detected alerting event is associated with a first one of the plurality of dwellings, wherein the autonomous vehicle is associated with a second one of the plurality of dwellings, wherein the database indicates that the first one of the plurality of dwellings is without an autonomous vehicle, wherein the database indicates that the autonomous vehicle associated with the second one of the plurality of dwellings is authorized to provide responses for the first one of the plurality of dwellings, and wherein the commanding the autonomous vehicle to autonomously relocate to a designated location moves the autonomous vehicle to or from the first one of the plurality of dwellings.

6. An alerting system comprising:
  a cluster server configured to provide a cluster directory and to coordinate interactions between cluster members identified in the cluster directory;
  an autonomous vehicle including an alert accessory, a wireless transceiver, and a crowd-sourcing controller for processing crowd-sourcing messages, wherein the crowd-sourcing controller is configured to communicate with the cluster server for registering in the cluster directory as a cluster member of a predetermined cluster; and
  a smart listening device located remotely from the autonomous vehicle comprising:
    an audio detector responsive to speech and ambient sounds to provide digital audio signals;
    a distributed controller coupled to the audio detector to execute responsive actions in response to the digital audio signals; and
    a communications circuit establishing a first communication link with a backend;
  wherein the smart listening device is configured to communicate with the cluster server for registering in the cluster directory as one of the cluster members of the predetermined cluster;
  wherein the distributed controller has a monitoring mode for detecting preconfigured alerting events and has an alert/response mode for executing responsive actions associated with the detected alerting events;
  wherein other smart listening devices in a plurality of dwellings within a neighborhood region are registered in the cluster directory as a cluster member of the predetermined cluster, and wherein the responsive actions include the cluster members exchanging messages corresponding to the detected alerting event; and
  wherein the responsive action includes commanding the autonomous vehicle to autonomously relocate to a designated location.

7. The alerting system of claim 6 wherein commanding the autonomous vehicle to autonomously relocate to a designated location further comprises instructions to (i) activate a sensor contained in the autonomous vehicle when the autonomous vehicle travels to or when it arrives at the designated location, and (ii) disseminate data gathered by the sensor to the cluster server regarding the detected alerting event.

8. The alerting system of claim 6 wherein commanding the autonomous vehicle to autonomously relocate to a designated location further comprises instructions to transport a person involved with the detected alerting event to or from the designated location.

9. The alerting system of claim 6 wherein commanding the autonomous vehicle to autonomously relocate to a designated location further comprises instructions to transmit a predetermined wireless message to a predetermined recipient when the autonomous vehicle arrives at the designated location.

10. The alerting system of claim 6 wherein the detected alerting event is associated with a first cluster member, wherein the autonomous vehicle is associated with a second cluster member, wherein the database indicates that the first cluster member is without an autonomous vehicle, wherein the database indicates that the autonomous vehicle is authorized to provide responses for the first cluster member, and wherein the commanding the autonomous vehicle to autonomously relocate to a designated location moves the autonomous vehicle to or from one of the plurality of dwellings which is associated with the first cluster member.

11. A method of neighborhood monitoring comprising:
configuring a cluster server within a public network to maintain a cluster directory identifying cluster members including a neighborhood of smart listening devices and user vehicles, wherein the neighborhood is associated with a cluster of dwellings, and wherein the user vehicles include at least one autonomous vehicle;
monitoring surroundings of the smart listening devices and the user vehicles using sensors in the smart listening devices and the user vehicles;
detecting an alerting event with one of the sensors;
a corresponding one of the smart listening devices and the user vehicles that detected the alerting event initiating a message to another cluster member based on the cluster directory; and
executing a responsive action in response to the detected alerting event, wherein the responsive action includes commanding the at least one autonomous vehicle to autonomously relocate to a designated location.

12. The method of claim 11 wherein the responsive action further comprises instructions to (i) activate a sensor contained in the autonomous vehicle when the autonomous vehicle travels to or when it arrives at the designated location, and (ii) disseminate data gathered by the sensor regarding the detected alerting event.

13. The method of claim 12 wherein the dissemination step is comprised of transmitting the data to the cluster server.

14. The method of claim 11 wherein the responsive action further comprises instructions to transport a person involved with the detected alerting event to or from the designated location.

15. The method of claim 14 wherein transporting the person to or from the designated location includes dropping off or picking up the person at one of the dwellings, wherein the one of the dwellings includes an automatic garage door opener, and wherein the responsive action further comprises instructions to activate the automatic garage door opener when the autonomous vehicle is at the one of the dwellings.

16. The method of claim 11 wherein the responsive action further comprises commanding the autonomous vehicle to transmit a predetermined wireless message to a predetermined recipient when the autonomous vehicle arrives at the designated location.

17. The method of claim 11 wherein the detected alerting event is associated with a first one of the dwellings, wherein the autonomous vehicle is associated with a second one of the dwellings, wherein the database indicates that the first one of the dwellings is without an autonomous vehicle, wherein the database indicates that the autonomous vehicle is authorized to provide responses for the first one of the dwellings, and wherein the commanding the autonomous vehicle to autonomously relocate to a designated location moves the autonomous vehicle to or from the first one of the dwellings.

18. The method of claim 11 wherein the cluster server is coupled to a response center providing communication with an emergency service provider.

19. The method of claim 18 wherein the autonomous vehicle moves to a corresponding location of an agent of the emergency service provider in order to pick up and transport the agent to one of the dwellings where the alerting event is detected.

20. The method of claim 11 wherein the designated location is adapted to block movement to and from an area impacted by the detected alerting event.

* * * * *